United States Patent
Khafagy et al.

(10) Patent No.: US 9,994,222 B2
(45) Date of Patent: Jun. 12, 2018

(54) VEHICLE AND START/STOP METHOD FOR A VEHICLE

(71) Applicant: FORD GLOBAL TECHNOLOGIES, LLC, Dearborn, MI (US)

(72) Inventors: Hafiz Shafeek Khafagy, Dearborn, MI (US); Eric Michael Rademacher, Royal Oak, MI (US); Yunjiao Cai, South Lyon, MI (US); Hank L. Kwong, Farmington Hills, MI (US); Hussam Makkiya, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/284,095

(22) Filed: Oct. 3, 2016

(65) Prior Publication Data
US 2018/0093669 A1    Apr. 5, 2018

(51) Int. Cl.
| | |
|---|---|
| *B60W 30/18* | (2012.01) |
| *F02N 11/08* | (2006.01) |
| *B60W 10/18* | (2012.01) |
| *B60W 10/06* | (2006.01) |
| *F16H 63/50* | (2006.01) |
| *F16H 61/32* | (2006.01) |

(52) U.S. Cl.
CPC ...... *B60W 30/18054* (2013.01); *B60W 10/06* (2013.01); *B60W 10/182* (2013.01); *F02N 11/0833* (2013.01); *F16H 63/50* (2013.01); *B60W 2510/101* (2013.01); *B60W 2520/06* (2013.01); *B60W 2550/142* (2013.01); *B60W 2710/186* (2013.01); *F16H 61/32* (2013.01)

(58) Field of Classification Search
None
See application file for complete search history.

(56) References Cited

U.S. PATENT DOCUMENTS

| | | |
|---|---|---|
| 5,653,659 A | 8/1997 | Kunibe et al. |
| 6,190,284 B1 | 2/2001 | Kuroda et al. |
| 6,502,908 B1 | 1/2003 | Mueller et al. |
| 6,676,565 B2 | 1/2004 | Mizutani |
| 8,690,731 B1 | 4/2014 | Sangameswaran et al. |
| 8,702,563 B1 | 4/2014 | Sangameswaran et al. |
| 9,056,606 B1 | 6/2015 | Rademacher et al. |
| 2005/0246081 A1 | 11/2005 | Bonnet et al. |
| 2011/0077830 A1 | 3/2011 | Lochocki, Jr. et al. |
| 2011/0207579 A1 | 8/2011 | Liu et al. |
| 2013/0124066 A1 | 5/2013 | Pebley et al. |
| 2014/0149022 A1 | 5/2014 | Geissenhoener |
| 2014/0235406 A1 | 8/2014 | Sangameswaran et al. |
| 2016/0244039 A1 | 8/2016 | Rizzo et al. |

FOREIGN PATENT DOCUMENTS

DE    112014003574 T5    4/2016

*Primary Examiner* — Jacob S. Scott
(74) *Attorney, Agent, or Firm* — David B. Kelley; Brooks Kushman P.C.

(57) ABSTRACT

A vehicle includes an engine, automatic transmission, and a controller. The engine is configured to auto-start and auto-stop. The automatic transmission has a shift-by-wire gear selector. The controller is programmed to, in response to shifting the gear selector to a neutral position while the engine is running, command the engine to auto-stop.

18 Claims, 2 Drawing Sheets

VEHICLE AND START/STOP METHOD FOR A VEHICLE

TECHNICAL FIELD

The present disclosure relates to control systems for vehicle engines.

BACKGROUND

Hybrid and micro-hybrid vehicles may include control systems that are configured to shut down the engine of the vehicle in order increase fuel economy and reduce emissions.

SUMMARY

A vehicle includes an engine, automatic transmission, and a controller. The engine is configured to auto-start and auto-stop. The automatic transmission has a shift-by-wire gear selector. The controller is programmed to, in response to shifting the gear selector to a neutral position while the engine is running, command the engine to auto-stop.

A vehicle includes an engine, automatic transmission, and a controller. The engine is configured to auto-start and auto-stop. The automatic transmission has a shift-by-wire gear selector. The controller is programmed to, in response to shifting the gear selector to a neutral position while the engine is auto-stopped, inhibit the engine from being auto-started.

A vehicle engine start/stop control method includes shifting an automatic transmission to a neutral position via a shift-by-wire gear selector while a vehicle engine is running, and auto-stopping the engine in response to the shifting.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
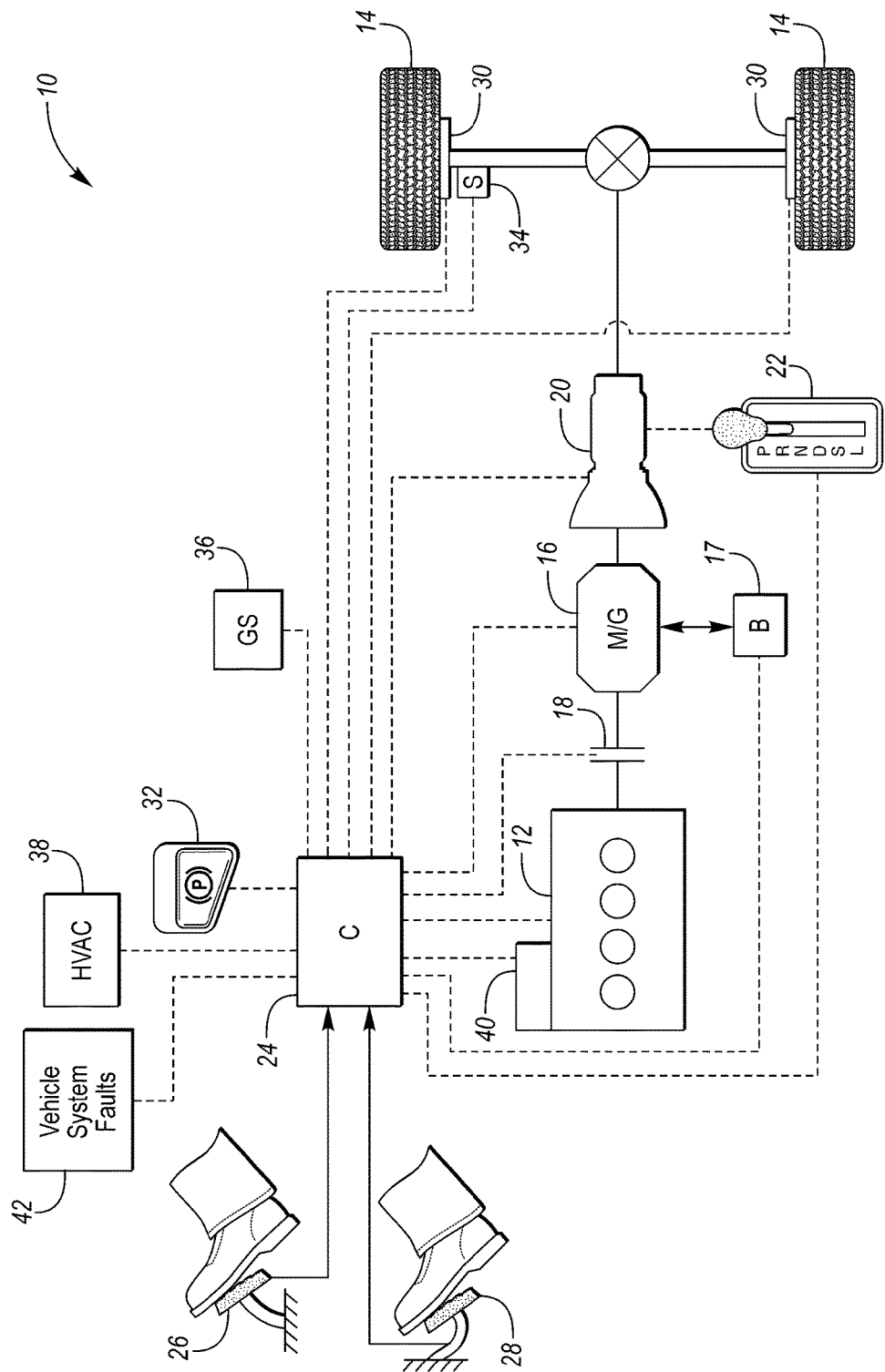
FIG. 1 is a schematic diagram representative of a vehicle and a vehicle powertrain.

Referring to FIG. 1, a diagram representative of a vehicle 10 and a vehicle powertrain is illustrated. The vehicle 10 includes an engine 12 that is configured to transmit power through the powertrain and to at least one drive wheel 14. The vehicle 10 may be a hybrid vehicle that includes a motor/generator (M/G) 16 that is also configured to transmit power through the powertrain and to at least one drive wheel 14. The M/G 16 may be configured to operate as both a motor and a generator. When operating as a motor, the M/G 16 may receive electrical power from a traction battery 17. When operating as a generator the M/G 16 may deliver electrical power to the traction battery 17 in order to recharge the traction battery 17. The engine 12 may be configured to selectively couple to and decouple from the powertrain through an engine disconnect clutch 18. The powertrain may also include a transmission (or gearbox) 20. The transmission 20 may be an automatic transmission that includes gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft and a transmission input shaft.

The transmission 20 may also include a gear selector 22 allows an operator to shift the transmission 20 between park (P), reverse (R), neutral (N), drive (D), sport (S), and low (L) positions. The gear selector 22 may be a shift-by-wire gear selector that sends a signal to the transmission 20 (or a controller thereof) to shift transmission 20 between the park (P), reverse (R), neutral (N), drive (D), sport (S), and low gear (L) positions. The signal sent from the gear selector 22 may be an electrical signal that is transmitted to the transmission 20 via an electrical wire or may be a wireless signal that is transmitted to the transmission 20 via a wireless transmitter. Wireless communications may be made via any known wireless technology known in the art. The gear selector 22 may be a lever, dial, one or more push buttons, touch screen, or any other user interface known in the art that may utilized as a gear selector. The gear selector 22 may be a combination of any of the user interfaces know in the art.

The powertrain further includes an associated controller 24 such as a powertrain control unit (PCU). While illustrated as one controller, the controller 24 may be part of a larger control system and may be controlled by various other controllers throughout the vehicle 10, such as a vehicle system controller (VSC). It should therefore be understood that the controller 24 and one or more other controllers can collectively be referred to as a "controller" that controls various actuators in response to signals from various sensors to control functions such as starting/stopping the engine 12, operating the M/G 16 to provide wheel torque or charge a battery, select or schedule shifts of the transmission 20, transition the transmission 20 to the desired gear based on an input from the gear selector 22, open/close the engine disconnect clutch 18, etc. The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 12 or vehicle 10.

Control logic or functions performed by the controller 24 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 24. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 26 may be used by the operator of the vehicle 10 to provide a demanded torque, power, or drive command to propel the vehicle 10. In general, depressing and releasing the accelerator pedal 26 generates an accelerator pedal position signal that may be interpreted by the controller 24 as a demand for increased power or decreased power, respectively. A brake pedal 28 may also be used by the operator of the vehicle 10 to provide a demanded braking torque to slow the vehicle. In general, depressing the brake pedal 28 generates a brake pedal position signal that may be interpreted by the controller 24 as a demand to decrease the vehicle speed. Based upon inputs from the accelerator pedal 26 and brake pedal 28, the controller 24 commands the torque to the engine 12, M/G 16, and/or friction brakes 30. The friction brakes 30 may include an electronic parking brake. The electronic parking brake may be activated by the controller 24 depending on specific conditions of the vehicle 10. The electronic parking brake may also be activated when the vehicle operator selects to activate the electronic parking brake through a user interface 32. The user interface 32 may be a push button that activates an electronic switch to engage the electronic parking brake.

The controller 24 may be configured to receive signals from sensors 34 that are configured to detect forward or reverse motion of the vehicle 10. The sensors 34 may be speed sensors that detect the rotational speed of the wheels 14 or the axle shafts of the vehicle 10. Alternatively the sensors 34 may be accelerometers, GPS systems, or any other devices that are capable of detecting motion of the vehicle 10.

The controller 24 may also be configured to receive signals from a gradient sensor 36 that is configured to determine the current gradient or slope of the road or surface that the vehicle 10 is resting or traveling on. The gradient sensor 36 may be an accelerometer, GPS system, or any other device that is capable of detecting the current gradient or slope of the road or surface that the vehicle 10 is resting or traveling on.

The vehicle 10 may include a heating, ventilation, an air conditioning (HVAC) system 38 that is configured to deliver heated or cooled air to a cabin of the vehicle 10. The HVAC system 38 may include an electric fan or blower that delivers the heated or cooled air to the cabin. The HVAC system 38 may direct air through a heater core of an engine cooling system in order to heat the air before delivering air to the vehicle cabin. The HVAC system 38 may direct air through an evaporator of a refrigerant system in order to cool the air before delivering the air to the vehicle cabin. The HVAC system 38 may direct air to the internal sides of the vehicle's windows when set to a defrost mode. The Defrost mode may also include directing electricity to electrical resistors that are directly attached to the windows. The blower may be set to a maximum speed when the HVAC system 38 is in a maximum heating mode, maximum air conditioning mode, or maximum defrost mode. The maximum air conditioning mode may include operating a compressor of the refrigerant system at a maximum power output capacity. The maximum defrost mode may also include operating the compressor of the refrigerant system at the maximum power output capacity. The HVAC system 38 includes a user interface that allows an operator to set the HVAC to any desired incremental heating, cooling, or defrost setting. Incremental heating, cooling, and defrost settings may include a series of incremental settings between zero and maximum heating, cooling, and defrost settings.

The engine 12 may be configured to auto-start or auto-stop based on various conditions of vehicle 10. The controller 24 may command a starter motor (which alternatively may be an integrated starter/generator) 40 to turn the crankshaft of the engine 12 in order to start the engine 12. Alternatively, the controller 24 may command the M/G 16 to turn the crankshaft of the engine 12 by closing the engine disconnect clutch 18.

Various systems of the vehicle 10 may include system faults 42. The controller 24 may be configured to auto-start the engine 12 and/or apply the electronic parking brake in response to specific system faults 42 of the various systems of the vehicle. System faults 42 that may require auto-starting the engine 12 and/or applying the electronic parking brake include transmission shift failures, transmission gear position failures, electric transmission oil pump failures (auto-starting the engine will power a mechanical transmission oil pump in the event the electric transmission oil pump fails), fluid levels in a transmission accumulator being less than a threshold (auto-starting the engine will power a mechanical transmission oil pump in the event the transmission oil level is too low in the transmission accumulator), power supply faults, alternator faults, vehicle speed faults, accelerator pedal faults, brake pedal faults, range sensor faults, etc.

The controller 24 may be configured to receive various states or conditions of the various vehicle components illustrated in FIG. 1 via electrical signals. The electrical signals may be delivered to the controller 24 from the various components via input channels. Additionally, the electrical signals received from the various components may be indicative of a request or a command to change or alter a state of one or more of the respective components of the vehicle 10. The controller 24 includes output channels that are configured to deliver requests or commands (via electrical signals) to the various vehicle components. The controller 24 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limiting. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
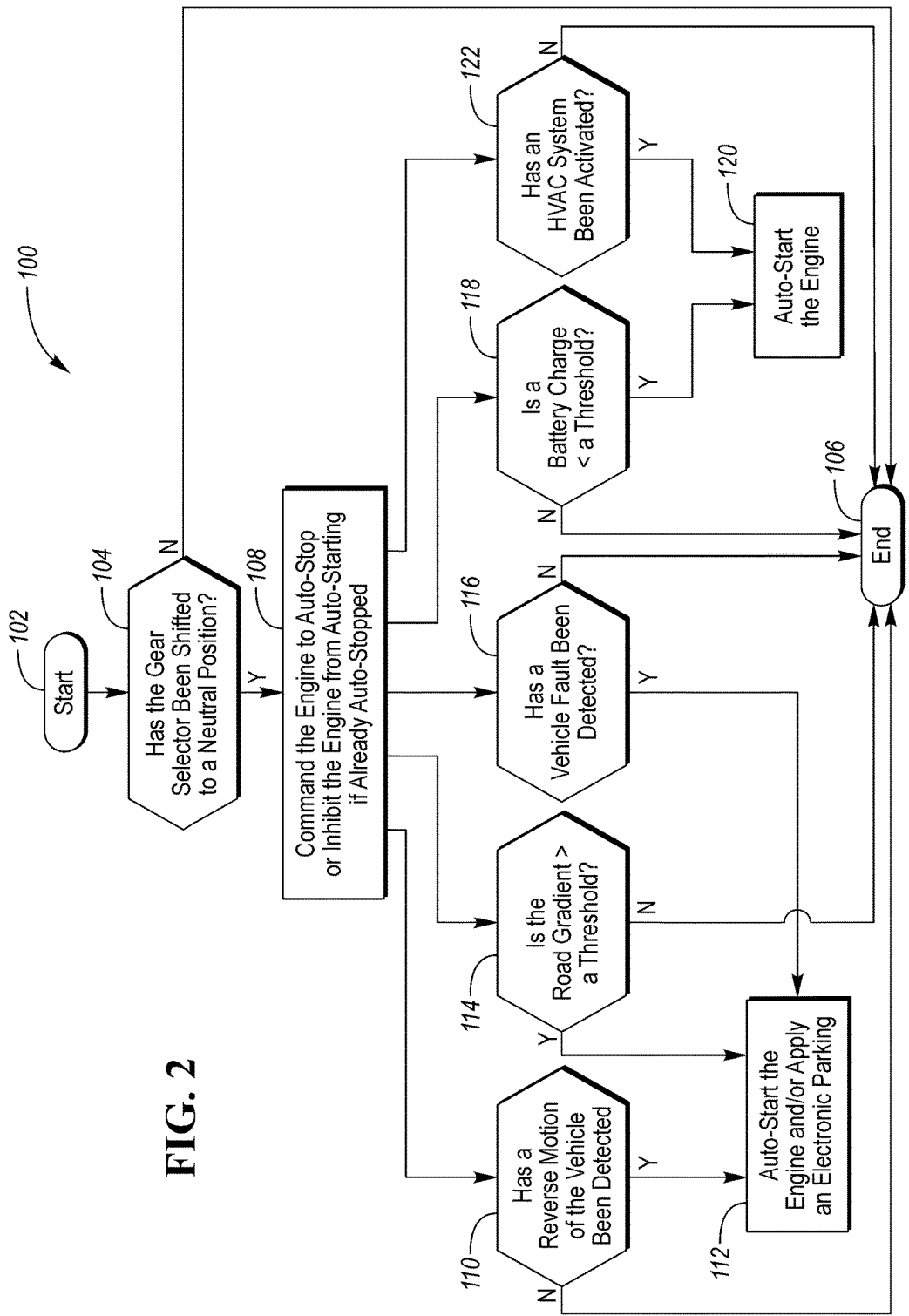
FIG. 2 is a flowchart illustrating a method of auto-stopping and auto-starting an engine in the vehicle.

Referring to FIG. 2, a method 100 of auto-stopping and auto-starting the engine 12 is illustrated. The method 100 may be stored as control logic and/or an algorithm within the controller 24. The controller 24 may implement the method 100 by controlling the various components of the vehicle 10. The method 100 is initiated at start block 102. Once the method 100 is initiated, the method 100 moves on to block 104 where it is determined if the shift-by-wire gear selector 22 has been shifted to the neutral (N) position from any other position including the park (P), reverse (R), drive (D), sport (S), and low gear (L) positions. The engine 12 may be running or auto-stopped when it is determined whether or not the gear selector 22 has been shifted to the neutral (N) position at block 104. If it is determined that the gear selector 22 has not been shifted to the neutral (N) position, the method 100 ends at block 106. If it is determined that the gear selector 22 has been shifted to the neutral (N) position the method 100 moves on to block 108. At block 108 the engine 12 is commanded to auto-stop if the engine 12 is running when the gear selector 22 is shifted to the neutral (N) position. The engine 12 may be commanded to auto-stop immediately upon shifting the gear selector 22 to the neutral (N) position without a time delay. Alternatively at block 108, the engine 12 is inhibited from auto-starting if the engine 12 was auto-stopped prior to the gear selector 22 being shifted to the neutral (N) position. The engine 12 may be auto-stopped or inhibited from auto-starting at block 108 with or without a simultaneous command from the vehicle operator to apply the friction brakes 30 via the brake pedal 28.

Once the condition is obtained at block 108 where both the engine 12 is auto-stopped and the gear selector 22 is in the neutral (N) position, the method 100 will determine if one or more conditions arise requiring the engine 12 to be auto-started while the gear selector 22 remains in the neutral (N) position. Conditions requiring the engine 12 to be auto-started may include, but are not limited to, detecting reverse motion of the vehicle 10, road gradient being greater than a threshold value, detecting specific vehicle faults, charge of the traction battery 17 being less than a threshold value, and activating the HVAC system 38 to a specific setting.

At block 110 the method 100 determines if a reverse motion of the vehicle 10 has been detected while the engine 12 is auto-stopped and the gear selector 22 is in the neutral (N) position. If a reverse motion of the vehicle 10 is not detected, the method 100 ends at block 106. If a reverse motion of the vehicle 10 is detected, the method 100 moves on to block 112 where the engine 12 is commanded to auto-start. The electronic parking brake may also be applied at block 112 in response to detecting reverse motion of the vehicle 10.

At block 114 the method 100 determines if the gradient of the surface (e.g., road surface) that the vehicle 10 is located on is greater than a threshold. If the grading is not greater than the threshold, the method 100 ends at block 106. If the gradient is greater than the threshold, the method 100 moves on to block 112 where the engine 12 is commanded to auto-start. The electronic parking brake may also be applied at block 112 in response to the gradient being greater than the threshold.

At block 116 the method 100 determines if a specific vehicle fault requiring auto-starting the engine 12 has been detected while the engine 12 is auto-stopped and the gear selector 22 is in the neutral (N) position. Specific faults requiring auto-starting the engine 12 include transmission shift failures, transmission gear position failures, electric transmission oil pump failures, fluid levels in a transmission accumulator being less than a threshold, power supply faults, alternator faults, vehicle speed faults, accelerator pedal faults, brake pedal faults, range sensor faults, etc. If a specific vehicle fault requiring auto-starting the engine 12 is not detected, the method 100 ends at block 106. If a specific vehicle fault requiring auto-starting the engine 12 is detected, the method 100 moves on to block 112 where the engine 12 is commanded to auto-start. The electronic parking brake may also be applied at block 112 in response to detecting a specific vehicle fault requiring auto-starting the engine 12.

At block 118 the method 100 determines if a charge of the traction battery 17 is less than a threshold while the engine 12 is auto-stopped and the gear selector 22 is in the neutral (N) position. If the charge of the traction battery 17 is not less than the threshold, the method 100 ends at block 106. If the charge of the traction battery 17 is less than the threshold, the method 100 moves on to block 120 where the engine 12 is commanded to auto-start.

At block 122 the method 100 determines if the HVAC system 38 has been activated to a specific setting while the engine 12 is auto-stopped and the gear selector 22 is in the neutral (N) position. If the HVAC system 38 has not been activated to the specific setting, the method 100 ends at block 106. If the HVAC system 38 has been activated to the specific setting, the method 100 moves on to block 120 where the engine 12 is commanded to auto-start. Specific settings of the HVAC system 38 requiring the engine 12 to auto-start may include activating the HVAC system in any mode (heating, cooling, defrost, etc.) at any incremental setting. Alternatively, specific settings of the HVAC system 38 requiring the engine 12 to auto-start may include activating the blower at a maximum setting or at an incremental setting above a specific threshold, activating the heating mode at a maximum setting or at an incremental setting above a specific threshold, activating the air conditioning mode at a maximum setting or at an incremental setting above a specific threshold, or activating the defrost mode at a maximum setting or at an incremental setting above a specific threshold.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine configured to auto-start and auto-stop;
   an automatic transmission having a shift-by-wire gear selector; and
   a controller programmed to,
      in response to shifting the gear selector to a neutral position while the engine is running, command the engine to auto-stop, and
      in response to detecting reverse motion of the vehicle while the engine is auto-stopped and the gear selector is in the neutral position, command the engine to auto-start.

2. The vehicle of claim 1, further comprising an electronic parking brake, wherein the controller is programmed to, in response to detecting reverse motion of the vehicle while the gear selector is in the neutral position, activate the electronic parking brake.

3. The vehicle of claim 1, wherein the controller is programmed to, in response a road gradient being greater than a threshold while the engine is auto-stopped and the gear selector is in the neutral position, command the engine to auto-start.

4. The vehicle of claim 3, further comprising an electronic parking brake, wherein the controller is programmed to, in response to the road gradient being greater than a threshold while the gear selector is in the neutral position, activate the electronic parking brake.

5. The vehicle of claim 1, wherein the controller is programmed to, in response to detecting a vehicle fault while the engine is auto-stopped and the gear selector is in the neutral position, command the engine to auto-start.

6. The vehicle of claim 5, further comprising an electronic parking brake, wherein the controller is programmed to, in response to detecting the vehicle fault while the gear selector is in the neutral position, activate the electronic parking brake.

7. The vehicle of claim 1, wherein the controller is programmed to, in response to a battery charge being less than a threshold while the engine is auto-stopped and the gear selector is in the neutral position, command the engine to auto-start.

8. The vehicle of claim 1, wherein the controller is programmed to, in response to activation of an HVAC system while the engine is auto-stopped and the gear selector is in the neutral position, command the engine to auto-start.

9. The vehicle of claim 1, wherein the gear selector is shifted from a drive position to the neutral position.

10. The vehicle of claim 1, wherein the gear selector is shifted from a reverse position to the neutral position.

11. The vehicle of claim 1, wherein the gear selector is shifted from a park position to the neutral position.

12. The vehicle of claim 1, wherein the gear selector is shifted from a sport position to the neutral position.

13. A vehicle comprising:
    an engine configured to auto-start and auto-stop;
    an automatic transmission having a shift-by-wire gear selector; and
    a controller programmed to, in response to shifting the gear selector to a neutral position while the engine is auto-stopped, inhibit the engine from being auto-started.

14. The vehicle of claim 13, further comprising an electronic parking brake, wherein the controller is programmed to, in response to detecting reverse motion of the vehicle while the engine is auto-stopped and the gear selector is in the neutral position, command the engine to auto-start and activate the electronic parking brake.

15. The vehicle of claim 13, further comprising an electronic parking brake, wherein the controller is programmed to, in response to a road gradient being greater than a threshold while the engine is auto-stopped and the gear selector is in the neutral position, command the engine to auto-start and activate the electronic parking brake.

16. The vehicle of claim 13, further comprising an electronic parking brake, wherein the controller is programmed to, in response to detecting a vehicle fault while the gear selector is in the neutral position, command the engine to auto-start and activate the electronic parking brake.

17. A vehicle engine start/stop control method comprising:
    shifting an automatic transmission to a neutral position via a shift-by-wire gear selector while a vehicle engine is running;
    auto-stopping the engine in response to the shifting; and
    auto-starting the engine while the engine is auto-stopped and the gear selector is in the neutral position in response to a road gradient exceeding a threshold.

18. The method of claim 17, further comprising auto-starting the engine while the engine is auto-stopped and the gear selector is in the neutral position in response to detecting reverse motion of the vehicle.

* * * * *